United States Patent [19]

Sugano et al.

[11] 4,347,564
[45] Aug. 31, 1982

[54] HIERARCHICAL-STRUCTURE PLANT CONTROL SYSTEM

[75] Inventors: Akira Sugano; Eiji Tooyama, both of Hitachi, Japan

[73] Assignee: Hitachi, Ltd., Tokyo, Japan

[21] Appl. No.: 162,890

[22] Filed: Jun. 25, 1980

[30] Foreign Application Priority Data

May 2, 1979 [JP] Japan ................................ 54-53330

[51] Int. Cl.³ ..................... G06F 15/46; G06F 15/16; G06F 11/16
[52] U.S. Cl. .................................. 364/132; 364/187; 371/9
[58] Field of Search .................. 364/101, 102, 119; 371/8, 9, 68, 131-136, 184, 187

[56] References Cited

U.S. PATENT DOCUMENTS

| | | | |
|---|---|---|---|
| 3,377,623 | 4/1968 | Reut et al. | 364/200 |
| 3,636,331 | 1/1972 | Amrehn | 364/119 X |
| 3,786,433 | 1/1974 | Notley et al. | 364/119 X |
| 4,123,794 | 10/1978 | Matsumoto | 364/101 |
| 4,133,027 | 1/1979 | Hogan | 364/119 |
| 4,141,066 | 2/1979 | Keiles | 371/9 X |

*Primary Examiner*—Joseph F. Ruggiero
*Attorney, Agent, or Firm*—Craig and Antonelli

[57] ABSTRACT

Sub-loop controllers arranged around a microprocessor are assigned to operation terminals to be controlled, and connected to a master controller and a host computer through a system bus to be supplied with a control command therefrom. Analog memories for manual control of the operation terminals are connected to the host computer through a special, common wiring. If one of the sub-loop controllers breaks down, the host computer directly controls the operation terminal by use of this analog memory thereby to back up the sub-loop controller.

6 Claims, 6 Drawing Figures

HIERARCHICAL-STRUCTURE PLANT CONTROL SYSTEM

The present invention relates to a hierarchical-structure plant control system including at least one host computer and a plurality of sub-loop controllers, and particularly to backing up the sub-loop controllers by the host computer.

There has been proposed a system in which a plant control function of computer is dispersed to a plurality of microcontrollers, and these microcontrollers are controlled by a host computer. Such system has a merit that as compared with other systems using a single, high-processing-capability computer for performing all the arithmetic operations, a failure occurrence in the system will almost damage to local portions only.

One example of this system is disclosed in Japanese Laid Open No. 143989/1975. In this example, there are provided a plurality of microcontrollers for the control of operation terminals and in addition thereto auxiliary microcontrollers for backing up these controllers. A newest control information from the microcontroller for the control of the operation terminals is always stored in a register within the host computer. If even one of these microcontrollers breaks down, one of the auxiliary microcontrollers is selected and the newest control information stored in the register is transferred to the selected microcontroller, which then operates to back up the defective microcontroller.

Thus, a redundant controller provided in the hierarchical-structure plant control system will increase the reliability of the system. However, the above system requires transfer of information until the auxiliary microcontroller starts backing-up operation, and thus provides a complicated procedure of starting backing-up, requiring much time for initiation of operation.

Accordingly, it is an object of the invention to provide a hierarchical-structure automatic plant control system having a new backing-up system which requires no transfer of information upon switching to the backing-up system.

It is another object of the invention to provide a hierarchical-structure automatic plant control apparatus having a few switching elements for the backing-up operation, and which therefore has a simplified circuit arrangement, thereby making it inexpensive with high reliability.

According to the invention, there is provided a hierarchical-structure plant control apparatus comprising at least one master controller for generating a control command signal for each of a plurality of amounts to be controlled, a plurality of sub-loop controllers supplied with these control demand signals to perform sub-loop control for each amount to be controlled, at least one host computer, and a plurality of analog memories which are provided for the control output from each of the sub-loop controllers and store continuous values of the control outputs from the sub-loop controllers, said host computer, if one of the sub-loop controllers breaks down, directly controlling the operation terminal by increasing or decreasing the value stored in said analog memories.

The above and other objects may be more apparent from the following description take in conjunction with the accompanying drawings in which.

Figure 1:
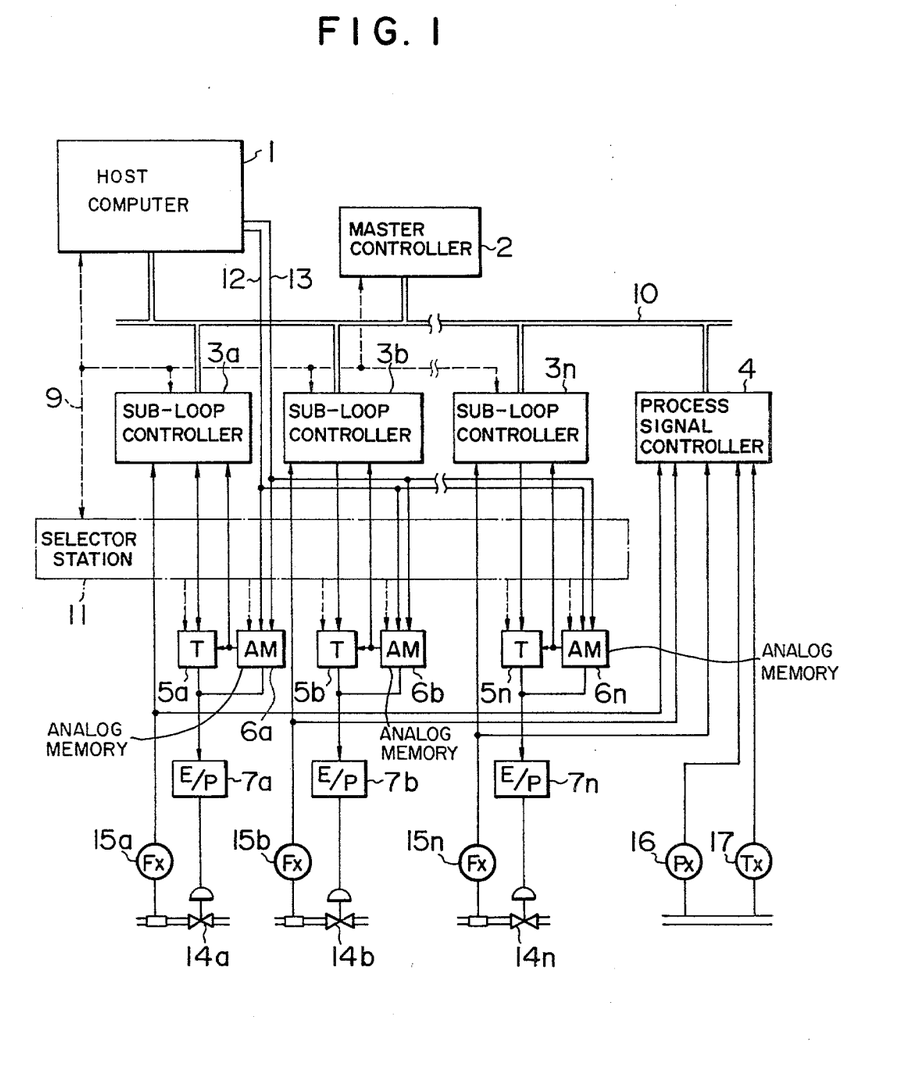
FIG. 1 is a block diagram of the whole arrangement of one embodiment of the invention.

FIG. 1 is a block diagram of an embodiment of the invention. For a large scale object to be controlled it is necessary to parallel control several kinds of process amounts which are related to each other. A master controller 2 as shown in FIG. 1 generates a demand signal for each of the process amounts related to each other.

On the other hand, a plurality of sub-loop controllers $3a$, $3b$, ... $3n$ as shown are supplied with the demand signals from the master controller 2 to control for the respective process amounts. As illustrated, the sub-loop controllers $3a$, $3b$, ... $3n$ serve to control the degree to which control valves $14a$, $14b$, ... $14n$ open so that the amounts of flow which amount-of-flow transducers $15a$, $15b$, ... $15n$ receive are respectively equal to the values of the demand signals supplied from the master control 2. The number of sub-loops depends on an object to be controlled, and accordingly the number of sub-loop controllers is changed in a control system.

A process signal controller 4 receives process signals necessary for controlling and monitoring an object to be controlled and performs a signal processing such as arithmetic operation for correction, and computation of average value. The detection terminals for process signals are, for example, a pressure transducer 16, a temperature transducer 17 and the aforementioned amount-of-flow transducers $15a$, $15b$ ... $15n$.

Either of the master controller, sub-loop controller and process signal controller is a kind of computer mainly including a 16-bit large-scale integrated microprocessor, that is, comprises a central processing unit including the microprocessor, a memory for storing a program and data, and an input/output unit. These controllers are connected to a host computer 1 by a system bus 10.

Analog memories $6a$, $6b$, ... $6n$ as shown serve to back up the sub-loop controllers $3a$, $3b$, ... $3n$, and normally store continuous values of the control signals from the sub-loop controllers $3a$, $3b$, ... $3n$. If change-over relays $5a$, $5b$ ... $5n$ are operated to be in the position of analog memory side, the outputs of the analog memories $6a$, $6b$, ... $6n$ are applied to electro-pneumatic converters $7a$, $7b$, ... $7n$ in place of the control signals from the sub-loop controllers $3a$, $3b$, ... $3n$. Since the values stored in the analog memories $6a$, $6b$, ... $6n$ can be decreased or increased by operator, manual operation at the operation terminals can be performed through the analog memories $6a$, $6b$, ... $6n$. The analog memories $6a$, $6b$, ... $6n$ are connected to the host computer 1 by common signal lines 12 and 13. The host computer 1 is able to back up the sub-loop controllers $3a$, $3b$ or $3n$ by using the analog memories $6a$, $6b$ or $6n$.

A selector station 11 as illustrated specifies an operation mode for each of the analog memories $6a$, $6b$, ... $6n$ and in association therewith includes relays for specifying an input to the change-over relays $5a$, $5b$, ... $5n$. If one of the sub-loop controllers $3a$, $3b$, ... $3n$ breaks down, this failure is detected by the master controller 2 or the defective sub-loop controller itself, and transmitted by a wired logic 9. Then, a relay included in the selector station 11 operates so that the computer 1 starts the back-up operation.

Before start of back-up operation, since the host computer 1 stores all the control programs for the sub-loop controllers 3a, 3b, . . . 3n and the analog memories 6a, 6b, . . . 6n also store control results (the degree to which the control valves open) until switching is performed, it is unnecessary to perform such data transfer as has been practised in the conventional system.

Moreover, the host computer 1 is able to supply increase or decrease command through the same signal lines even when backing up any one of the sub-loop controllers, and thus this system has its switching part simplified and has high reliability with low cost.

The arrangement and operation of the analog memories will be described below.

Figure 2:
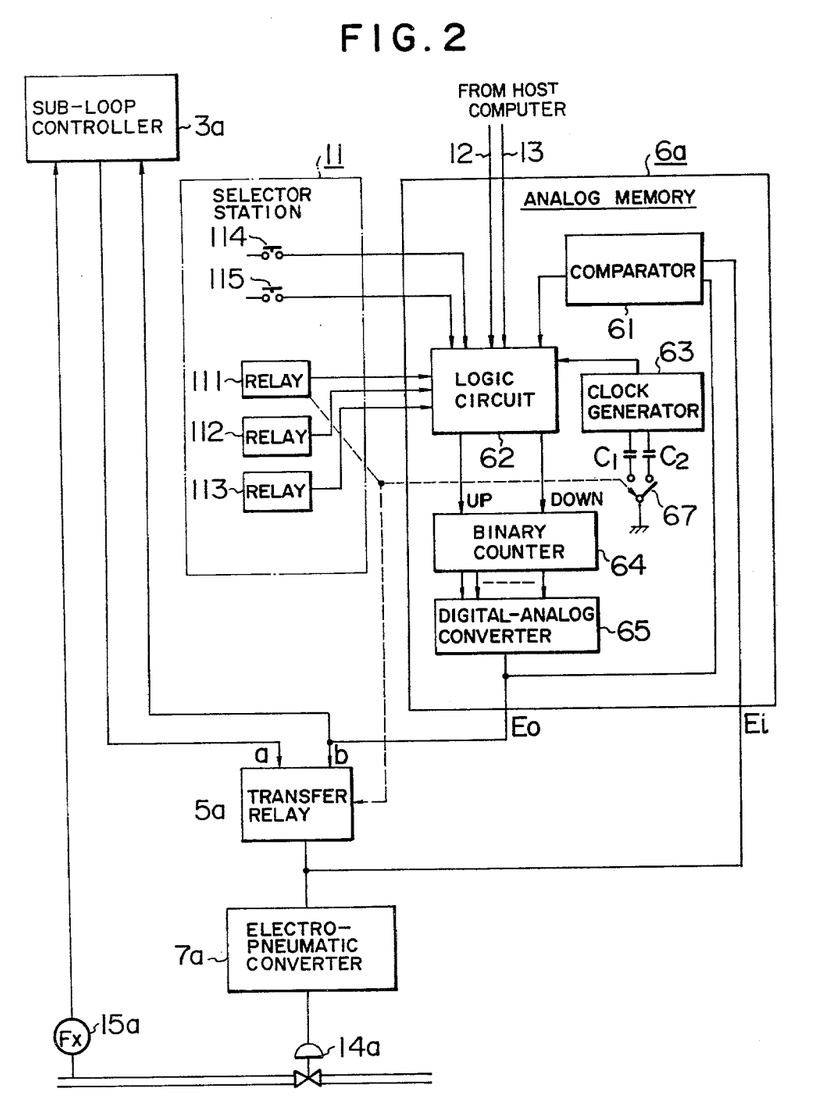
FIG. 2 is a detailed block diagram of part of FIG. 1.

FIG. 2 is a more specific diagram of part of the embodiment of FIG. 1. As shown in FIG. 2, the analog memory 6a includes a comparator 61, a logic circuit 62, a clock oscillator 63, a binary counter 64 and a digital to analog (D/A) converter 65.

The operation mode of the analog memory 6a is specified by relays 111, 112 and 113 which the selector station 11 has. The relay 111 selects the automatic tracking mode. The relay 111 is actuated to supply an automatic tracking mode command to the logic circuit 62, and at the same time to permit the change-over relay 5a to select the line a. Then, the output of the sub-loop controller 3a is applied to the electro-pneumatic converter 7a, thus the degree of opening of the controller valve 14a is controlled by the sub-loop controller 3a. When the automatic tracking mode command is applied to the logic circuit 62, the output voltage $E_o$ from the analog memory 6a follows the input voltage $E_i$, or the output of the sub-loop controller 3a. This tracking mode is effected by the fact that the binary counter 64 counts in accordance with the output of the comparator 61 which compares the output $E_o$ and the input voltage $E_i$. In other words, if $E_i > E_o$, the comparator produces "1" level output during the period of which the binary counter 64 is supplied at its up-terminal with a pulse in synchronism with the clock signal from the clock oscillator 63. On the contrary, if $E_i < E_o$, the comparator 61 produces "0" output level, during the period of which the pulse from the logic circuit 62 is applied to the down-terminal of the binary counter 64. Therefore, the count of the binary counter 64 is converted to an analog signal by the D/A converter 65 to that the output $E_o$ of the converter 65 will follow the input $E_i$. The output $E_o$ of the analog memory 6a is applied to the sub-loop controller 3a, where the voltage $E_o$ from the analog memory 6a is compared with the control signal resulting from the self computation. If the difference is deviated from a certain value, the analog memory 6a is decided for its automatic tracking operation to be abnormal.

The relay 112 specifies the mode of the host computer. When the relay 112 is actuated, the relay 111 is deenergized to permit the change-over relay 5a to switch to the line b. At the same time, the analog memory 6a stops tracking operation to hold the value at that time. The logic circuit 62, when supplied with the mode command from the host computer 1 upon actuation of relay 112, generates a pulse in accordance with the increase or decrease command from the host computer 1 through the signal lines 12 and 13 and applies it to the up-input or down-input of the binary counter 64. Consequently, the analog memory 6a is controlled by the command from the host computer 1 to produce output $E_o$, which then controls the control valve 14a to open.

The relay 113 selects the manual mode. When supplied with the manual mode command from the relay 113, the logic circuit 62 applies a pulse to the up-input or down-input of the binary counter 64 in response to the on-off operation of an increase contact 114 or decrease contact 115. Thus, the increase contact 114 and decrease contact 115 are operated to open and close the control valve 14a, respectively.

Figure 3:
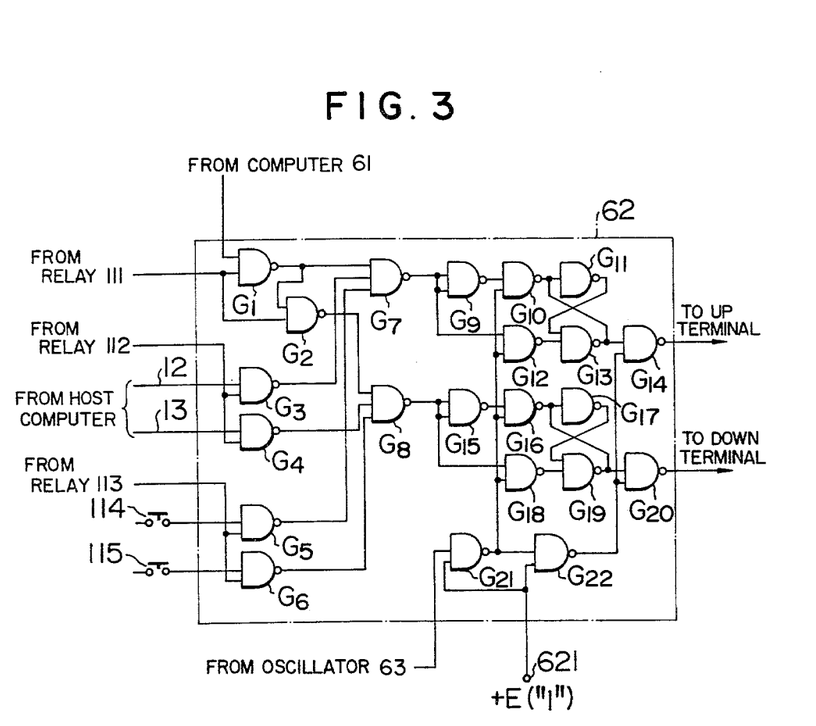
FIG. 3 is a detailed circuit diagram of the block 62 in FIG. 2.

The logic circuit 62 for such switching of the modes as described above can be realized with the circuit arrangement of FIG. 3, in which NAND gates $G_1$, $G_2$, $G_3$, $G_4$, $G_5$, $G_6$, $G_7$ and $G_8$ constitute a selector. The gates $G_7$ and $G_8$ produce outputs the level of which depends on the output of the comparator 61 when the level of the automatic tracking mode command from the relay 111 is "1", the signal levels on the signal lines 12 and 13 when the host computer mode command from the relay 112 is "1", and the on-off operation of the increase contact 114 and decrease contact 115 when the manual mode command from the relay 113 is "1".

Figure 4:
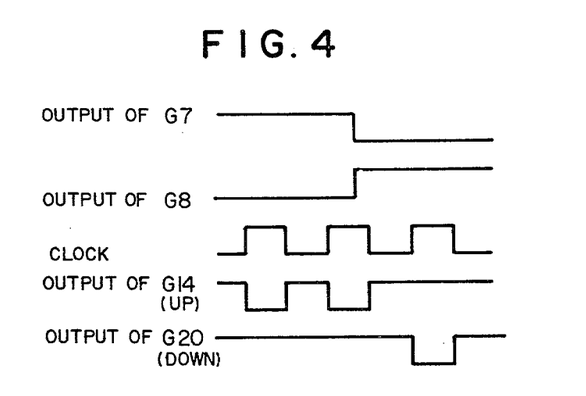
FIG. 4 is a timing chart showing the operation of part of FIG. 3.

NAND circuits $G_9$ to $G_{12}$ constitute a synchronizing circuit. FIG. 4 is a timing chart showing the input-output relation of the synchronizing circuit. It will be seen from the chart that if the output level of $G_7$ is "1" at a rising edge of the clock signal from the clock oscillator 63, the gate $G_{14}$ produces an inverted clock signal which is counted up step by step at its falling edges by the counter 64. If the output level of $G_8$ is "1", the gate $G_{20}$ produces a pulse, which the counter 64 counts down at its falling edges step by step.

Shown at 67 in FIG. 2 is a switch for changing the oscillation frequency of the clock oscillator 63. In this embodiment, 200-Hz clock signal is selected for the automatic tracking mode, and 20-Hz clock signal for the host computer mode and manual mode. Since the binary counter 64 is of 10-bits, about 40 seconds are required to change the output $E_o$ to full scale in the host computer mode and manual mode. On the other hand, for automatic tracking mode, the output $E_o$ follows the input $E_i$ at the rate of about 5 seconds per full scale and thus the automatic tracking can be performed with little delay.

The logic circuit 62 has a single step specifying terminal 621 as shown in FIG. 3. If "0" level is supplied to this terminal 621, the gates $G_{21}$ and $G_{22}$ are closed to block the input clock pulse. Under this condition, the outputs of the gates $G_7$ and $G_8$ are reversed and transmitted to the gates $G_{14}$ and $G_{20}$. Thus, the outputs of the gates $G_7$ and $G_8$ are counted directly by the binary counter 64. If a circuit is connected to supply "0" level to the terminal 621 in the manual mode, the output of the analog memory 6a is increased or decreased by one step by one action of closing and opening the increase contact 114 or decrease contact 115. In the host computer mode, if a circuit is connected to supply "0∞ level to the terminal 621, the host computer 1 is able to produce an increase command or decrease command by a pulse train of its own period.

The switching sequence for backing up will be described below.

Figure 5:
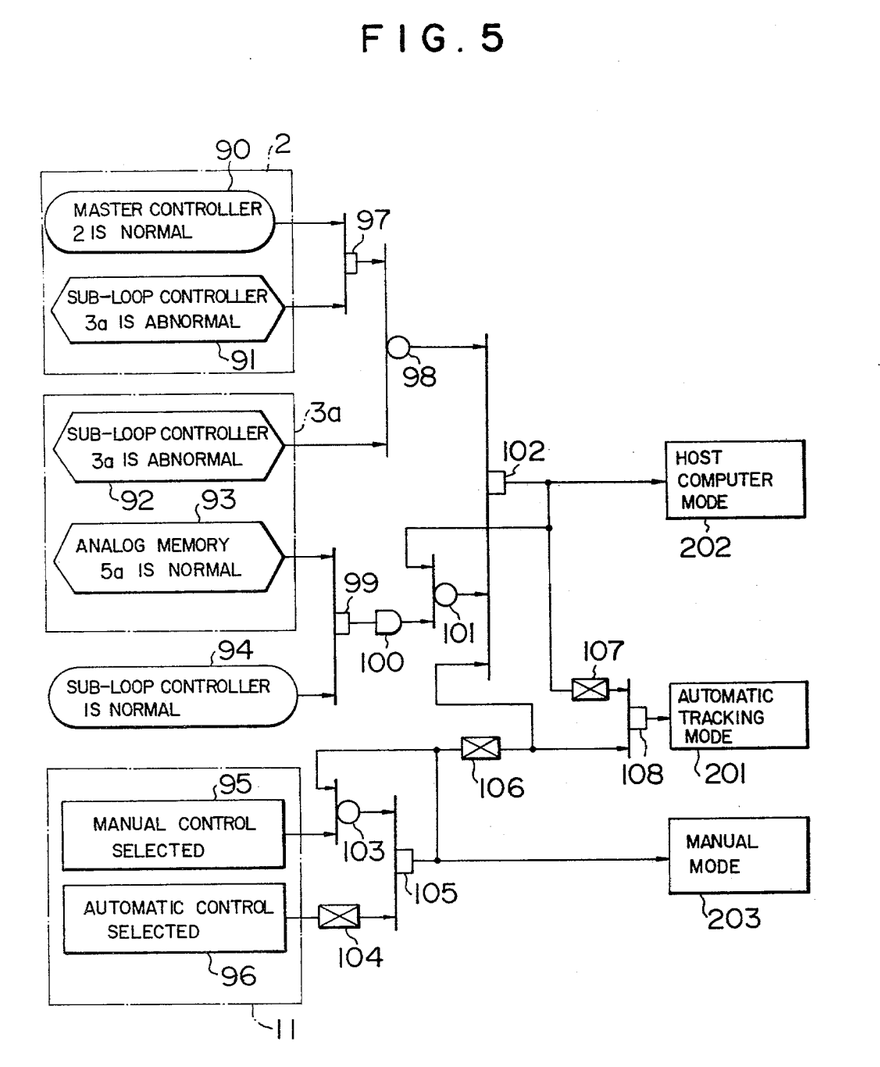
FIG. 5 is a sequence diagram of a specific example of the wired logic 9 in FIG. 2.

The relays 111, 112 and 113 for selecting the three kinds of operation modes in the analog memory 6a as described above are driven by a logic circuit as shown in FIG. 5. This logic circuit is only a part of the wired logic 9 in FIG. 1, relating to switching of analog memory 6a, and hence the same logics are used for the other analog memories.

Referring to FIG. 5, numeral 90 represents a self-examining function which is included in the master controller 2 and which shows that the master controller 2 is normal. Numeral 91 denotes another examining function provided in the master controller 2. This function indicates that the sub-loop controller 3a is abnormal. The sub-controller 3a includes a self-examining function 92 which shows that the sub-controller 3a is abnormal, and a monitor function 93 for tracking operation of analog memory 5a. Shown at 94 is a function for producing output of "normal" when there are no both "abnormal" outputs from the functions 91 and 92, or when the sub-loop controller is normal.

The selector station 11 has switches for selecting manual and automatic control of the degree to which the control valve 15a opens. Numerals 95 and 96 show the conditions in which the switch for selecting the manual control is turned on and the switch for selecting the automatic control is turned on, respectively. Numerals 97, 99, 102, 105 and 108 represent AND logics, 98, 101 and 103. OR logics, 100 a time release timer, and 104, 106 and 107 NOT logics.

It will be understood from FIG. 5 that when the following three conditions are satisfied, the AND logic 102 selects a host computer mode 202;

(a) The sub-loop controller 3a is abnormal.

(b) The automatic tracking operation of the analog memory 6a is normal.

(c) The automatic control mode has been selected in the selector station. The host computer mode 202 continuates until the condition (a) or (c) is released from. The relay 112 in the selector station 11 operates under such condition, where the host computer 1 controls the control valve 14a by using the analog memory 6a in place of the sub-loop controller 3a.

When the automatic control mode is selected but the above condition (a) or (b) is not satisfied, the automatic tracking mode 201 is held at all times, under which the relay 111 is operated. At this time the control valve 14a is controlled by the output of the sub-loop controller 6a.

Even in either of the above two modes, once the condition 95 is satisfied, or manual mode is selected, the "1"-level input to the OR logic 103 permits the AND logic 105 to produce "1"-level output and thus the manual mode 203 is held. The relay 113 operates under this condition.

As described above, in the embodiment, the switching from the automatic tracking mode to the host computer mode, that is, the initiation of backing up by the host computer 1, is made only when the analog memory correctly follows the output of the sub-loop controller. Therefore, upon switching, the degree to which the control valve opens is not suddenly changed, and thus smooth switching is performed.

Figure 6:
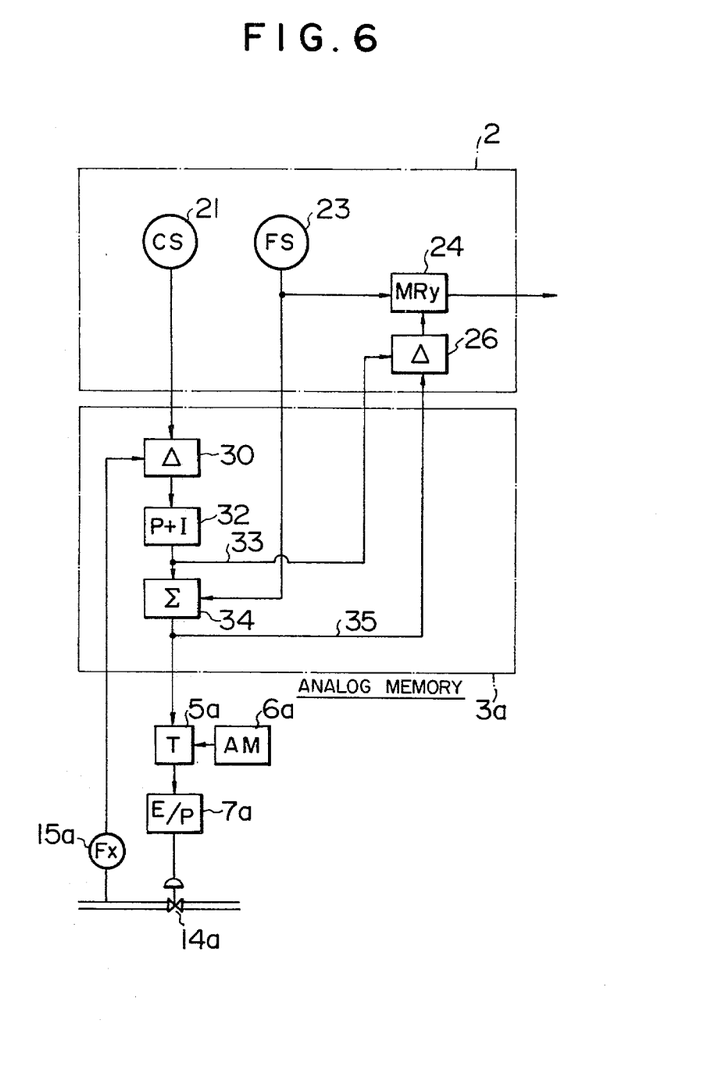
FIG. 6 is a block diagram showing the function of the block 91 of FIG. 5.

For self-examination of the master controller and sub-controller as shown at 90 and 92, there are employed known methods of checking rate of change and upper and lower limits of the output. The examination of sub-loop controller by master controller as shown at 91 is performed as shown in FIG. 6. In the master controller 2, a control demand consisting of a command signal 21 and a preceding signal 23 is applied to the sub-loop controller 3a. A subtractor 30 in the sub-loop controller 3a produces a difference signal representing the difference between the command signal 21 and a feedback signal from an amount-of-flow oscillator 15a. The difference signal is applied to a P.I adjuster 32 where PI operation is performed to produce a correction signal 33. The correction signal 33 and the preceding signal 23 from the master controller 2 are supplied to an adder 34, which then produces a control output 35. In the master controller 2, a subtractor 26 produces a signal representing the difference between the correction signal 33 and the control output 35. The difference signal from the subtractor 26 and the signal 23 are supplied to a monitor 24 which monitors whether or not these signals are equal to each other. If agreement is not achieved, addition by the adder 34 is not performed normally and thus the operation of the sub-loop controller 3a is examined to be abnormal.

The blocks 24, 26, 30, 32 and 34 as shown are logics for executing a program.

In this embodiment, in addition to the self-examination of computer which is common practice in the prior art, the sub-loop controller is examined by the master controller, and thus failure detection precision is high.

The soft ware of each controller will be described below.

In this embodiment, the host computer 1, master controller 2, sub-loop controllers 3a, 3b, 3n, and process signal controller 4 are all provided with a common, fixed processing program for operating elements of No. 1 to No. 22 as shown in Table 1. The operation by each element is tarbulated on the column of "Function". The elements of No. 1 to No. 7 perform logic processing, and those of No. 8 to No. 22 perform analog processing.

The control program in each controller is built up in the form shown on the column of "Table specification". That is, the control program is formed of part showing one of the elements of No. 1 to No. 22, and the other part showing an object to be computed (or related connection), set values, upper and lower limits and so on.

The host computer 1 stores all the control programs of the sub-loop controllers 3a, 3b, 3n in the form of "Table specification". If one of the sub-loop controllers breaks down, the output of the "abnormal" detection means as described previously is transmitted to the host computer 1, which starts backing-up operation by initiation of the corresponding control program.

TABLE 1

| No. | Element | Symbol | Table specification | Function |
|---|---|---|---|---|
| 1 | AND | $x_1, x_2, x_N \rightarrow y$ | AND \| N <br> y (OUT) <br> $x_1$ (IN$_1$) <br> $x_2$ (IN$_2$) <br> ⋮ <br> $x_N$ (IN$_N$) | $y = (x_1)\wedge(x_2)\wedge \ldots \wedge(x_N)$ <br> N: $1 \leq N \leq 255$ |
| 2 | OR | $x_1, x_2, x_N \rightarrow y$ | OR \| N <br> y (OUT) <br> $x_1$ (IN$_1$) <br> $x_2$ (IN$_2$) <br> ⋮ <br> $x_N$ (IN$_N$) | $y = (x_1)\vee(x_2)\vee \ldots \vee(x_N)$ <br> N: $1 \leq N \leq 255$ |
| 3 | NOT | $x \rightarrow y$ | NOT <br> y (OUT) <br> x (IN) | $x = 0 \quad y = 1$ <br> $x = 1 \quad y = 0$ |
| 4 | FLIP FLOP | $x_1 \rightarrow S, x_2 \rightarrow R \rightarrow y$ | FF <br> y (OUT) <br> $x_1$ (IN$_1$) <br> $x_2$ (IN$_2$) <br> IC (IV) | $\begin{array}{ccc} x_1 & x_2 & y \\ 0 & 0 & * \\ 1 & 0 & 1 \\ 0 & 1 & 0 \\ 1 & 1 & 0 \end{array}$ <br> *$y_j = y_{j-1}$ |
| 5 | TD · PU | $x \rightarrow$ TD · PU, TD$^{SEC}$ $\leftarrow y$ | TD · PU <br> y (OUT) <br> x (IN) <br> IC (IV) <br> T (T$_s$) <br> TD (T$_D$) | When $x = 1$ <br> $\quad$ IC (j) = IC(j − 1) + T <br> $\quad$ IC (j) $\geq$ TD $\quad y = 1$ <br> $\quad$ IC (j) $<$ TD $\quad y = 0$ <br> When $x = 0$ <br> $\quad$ IC (0) = 0 $\quad y = 0$ |
| 6 | TD · DO | $x \rightarrow$ TD · DO, TD$^{SEC}$ $\rightarrow y$ | TD · D <br> y (OUT) <br> x (IN) <br> IC (IV) <br> T (T$_s$) <br> TD (T$_D$) | When $x = 1$ $\quad y = 1$ $\quad IC_o = 0$ <br> When $x = 0$ <br> $\quad$ IC (j) = IC (j − 1) + T <br> $\quad$ IC $\geq$ TD: $y = 0$ <br> $\quad$ IC $<$ TD: $y = 1$ <br> Where <br> $\quad$ T: sampling period <br> $\quad$ TD: TD · DO set value |

TABLE 1-continued

| No. | Element | Symbol | Table specification | Function |
|---|---|---|---|---|
| 7 | TD · WO |  | TD · WO / <br> y (OUT) <br> x (IN) <br> IC (IV) <br> T ($T_s$) <br> TD ($T_D$) |  <br> When x = 1 <br> $IC(j) = IC(j-1) + T$ <br> $IC(j) \geq TD: y = 0$ <br> $IC(j) < TD: y = 1$ <br> When x = 0 <br> $y = 0$ $IC(O) = 0$ <br> Where <br> T: sampling period <br> $T_D$: TD · WO set value |
| 8 | ANALOG SW |  | ASW / <br> y (OUT) <br> $x_1$ ($IN_1$) <br> $x_2$ ($IN_2$) <br> SW (SW) | (i) When SW = 1 <br> $y = x_1$ <br> (ii) When SW = 0 <br> $y = x_2$ |
| 9 | SUMMER Type 1 |  | $ADD_1$ N <br> y (OUT) <br> $x_1$ ($IN_1$) <br> $x_2$ ($IN_2$) <br> ⋮ <br> $x_N$ ($IN_N$) <br> $G_1$ ($G_1$) <br> $G_2$ ($G_2$) <br> ⋮ <br> $G_N$ ($G_N$) <br> $Z_2$ ($H_L$) <br> $Z_1$ ($L_L$) | $y = \sum_{i=1}^{N} G_i x_i$ <br> N: $1 \leq N \leq 255$ <br> (i) When $y \geq Z_2$ <br> $y = Z_2$ <br> (ii) When $y \leq Z_1$ <br> $y = Z_1$ <br> (iii) When $Z_1 < y < Z_2$ <br> $y = y$ |
| 10 | FUNCTION GENERATOR |  <br><br> \| $a_0$ \| $b_0$ \| <br> \| $a_1$ \| $b_1$ \| <br> \| $a_2$ \| $b_2$ \| <br> \| ⋮ \| ⋮ \| <br> \| $a_N$ \| $b_N$ \| | FG N <br> y (OUT) <br> x (IN) <br> $a_0$ ($A_0$) <br> $b_0$ ($B_0$) <br> $a_1$ ($A_1$) <br> $b_1$ ($B_1$) <br> ⋮ <br> $a_N$ ($A_N$) <br> $b_N$ ($B_N$) |  <br> (1) $x \leq a_0$: $y = b_0$ <br> (2) $a_0 \leq x \leq a_1$: <br> $y = \dfrac{b_1 - b_0}{a_1 - a_0}(x - a_0) + b_0$ <br> (i) $a_{i-1} \leq x \leq a_i$: <br> $y = \dfrac{b_i - b_{i-1}}{a_i - a_{i-1}}(x - a_{i-1}) + b_{i-1}$ <br> (N) $x \geq a_N$ <br> $y = b_N$ |

TABLE 1-continued

| No. | Element | Symbol | Table specification | Function |
|-----|---------|--------|---------------------|----------|
| 11 | SIGNAL GENERATOR | SG / C → y | SG / ; y (OUT) ; C (SET) | $y = C$ |
| 12 | MONITOR RELAY | $x_1, x_2$ → MR → y; $Z_1, Z_2$ | MR / ; y (OUT) ; $x_1$ (IN$_1$) ; $x_2$ (IN$_2$) ; $Z_2$ (H$_s$) ; $Z_1$ (L$_s$) | (1) $x_1 - x_2 \leq Z_1$ <br> $y = 1$ <br> (2) $x_1 - x_2 > Z_2$ <br> $y = 1$ |
| 13 | PI CONTROLLER | SW ↓ ; x → P+I → y ; P, $T_I$, $Z_1$, $Z_2$ ; $y_H$ | PI / ; y (OUT) ; x (IN) ; IC$_1$ (IV$_1$) ; IC$_2$ (IV$_2$) ; $y_H$ (SM) ; SW (AH) ; T (T$_s$) ; KP (K$_p$) ; T$_I$ (T$_I$) ; $Z_2$ (H$_L$) ; $Z_1$ (L$_L$) | (i) When SW = 1 (Auto mode) <br> $y = \left(K_p - \dfrac{T}{T_I}\right) x_i + IC_1 + \dfrac{IC_2}{T_I}$ <br> $IC_1 = IC_0 + \dfrac{T}{T_I} \sum_{j=1}^{i-1} x_j$ <br> $IC_2 = \dfrac{Tx_i + IC_2}{T_I}$ remainder <br> (ii) When SW = 0 (Auto mode) <br> $y = y_H$ <br> $IC_1 = y_H - K_p x$   $IC_2 = 0$ <br> a. When $y \geq Z_2$   $y = Z_2$ <br> b. When $Z_1 \leq y \leq Z_2$   $y = y$ <br> c. When $y \leq Z_1$   $y = Z_1$ |
| 14 | ANALOG MEMORY | SW ↓ ; $S_A$ → AM → y ; UP, DOWN, RATE | AM / ; y (OUT) ; IC (IN) ; $S_A$ (AS) ; SW (AH) ; UP (I) ; DOWN (D) ; RATE (DLT) ; $Z_2$ (H$_L$) ; $Z_1$ (L$_L$) | (i) SW = 1 (Auto) <br> $y = S_A$, $I_C = y$ <br> (ii) SW = 0 (Manual) <br> $y = I_C +$ RATE (UP) − RATE (DOWN) <br> y: initial value <br> (UP): 1 in UP mode <br> (DOWN): 1 in DOWN mode <br> Both (UP) and (DOWN) are "0" at 1 both UP and DOWN <br> $I_c = y$ |

TABLE 1-continued

| No. | Element | Symbol | Table specification | | Function |
|---|---|---|---|---|---|
| 15 | SIGNAL LAG | x → [LAG ○ $T_L$ $Z_1$ $Z_2$] → y | LAG | ╱ | (i) When $Z_1 \leq y \leq Z_2$ |
| | | | y (OUT) | | $y = \dfrac{T(x - IC_1) + IC_2}{T_L} + IC_1$ |
| | | | x (IN) | | $IC_1 = y_{j-1}$ |
| | | | $IC_1$ $(IV_1)$ | | $IC_2 = \dfrac{T(x_0 - IC_1) + IC_2}{T_L}$ remainder |
| | | | $IC_2$ $(IV_2)$ | | $x_0$: initial value |
| | | | T $(T_S)$ | | (ii) When $y \geq Z_1$ $y = Z_1$ |
| | | | $T_L$ $(T_L)$ | | (iii) When $y \geq Z_2$ $y = Z_2$ |
| | | | $Z_2$ $(H_L)$ | | |
| | | | $Z_1$ $(L_L)$ | | |
| 16 | DIFFER-ENTIAL | x → [d/dt ○ $K_D$ $T_L$ $Z_1$ $Z_2$] → y | DIF | ╱ | (i) When $Z_1 \leq y \leq Z_2$ |
| | | | y (OUT) | | $y = \dfrac{T_L}{T + T_L} y_{j-1} + \dfrac{K_D}{T + T_L}(x_i - x_{i-1})$ |
| | | | x (IN) | | $y_{i-1}$: initial value $(IC_1)$ |
| | | | $IC_1$ $(IV_1)$ | | $x_{i-1}$: initial value $(IC_2)$ |
| | | | $IC_2$ $(IV_2)$ | | (ii) $y \leq Z_1$ $y = Z_1$ |
| | | | T $(T_S)$ | | (iii) $y \geq Z_2$ $y = Z_2$ |
| | | | $K_D$ $(K_D)$ | | |
| | | | $T_L$ $(T_L)$ | | |
| | | | $Z_2$ $(H_L)$ | | |
| | | | $Z_1$ $(L_L)$ | | |
| 17 | HIGH SELECTOR | $x_1, x_2, x_N$ → [H>○] → y | HS | N | $y = \text{Max}(x_1, x_2 \ldots, x_N)$ |
| | | | y (OUT) | | |
| | | | $x_1$ $(IN_1)$ | | |
| | | | $x_2$ $(IN_2)$ | | |
| | | | ⋮ | | |
| | | | $x_N$ $(IN_N)$ | | |
| 18 | LOW SELECTOR | $x_1, x_2, x_N$ → [L<○] → y | LS | N | $y = \text{Min}(x_1, x_2 \ldots x_N)$ |
| | | | y (OUT) | | |
| | | | $x_1$ $(IN_1)$ | | |
| | | | $x_2$ $(IN_2)$ | | |
| | | | ⋮ | | |
| | | | $x_N$ $(IN_N)$ | | |

TABLE 1-continued

| No. | Element | Symbol | Table specification | Function |
|---|---|---|---|---|
| 19 | LIMITER | (symbol with $Z_1$, $Z_2$) | LIM / y (OUT) / x (IN) / $Z_2$ ($H_L$) / $Z_1$ ($L_L$) | (i) When $Z_1 \leq x \leq Z_2$<br>   $y = x$<br>(ii) When $y \leq Z_1$<br>   $y = Z_1$<br>(iii) When $y \geq Z_2$<br>   $y = Z_2$ |
| 20 | INVERTER | (symbol) | SC / y (OUT) / x (IN) | $y = -x$ |
| 21 | MULTIPLIER | (symbol with $G_A$, X, $G_B$, $X_o$, $Y_o$, $Z_1$, $Z_2$) | MUL / y (OUT) / $x_1$ ($IN_1$) / $x_2$ ($IN_2$) / $X_o$ ($X_o$) / $G_B$ ($G_B$) / $G_A$ ($G_A$) / $Y_o$ ($Y_o$) / $Z_2$ ($H_L$) / $Z_1$ ($L_L$) | (i) When $Z_1 \leq y \leq Z_2$<br>   $y = (x_1 + X_o)(G_A + G_B x_2) + Y_o$<br>(ii) When $y \leq Z_1$<br>   $y = Z_1$<br>(iii) When $y \geq Z_2$<br>   $y = Z_2$ |
| 22 | RATE LIMITER | (symbol d/dt with $D_L$, $I_L$, $T_I$, $Z_1$, $Z_2$) | RL / y (OUT) / x (IN) / $IC_1$ ($IV_1$) / $IC_2$ ($IV_2$) / T ($T_s$) / $I_L$ ($H_L$) / $D_L$ ($L_L$) / $T_I$ ($T_I$) | (i) When $x - IC_1 < 0$<br>   $y = \dfrac{-T \cdot D_L + IC_2}{T_I} + IC_1$<br>   $IC_1 = y_i$<br>   $IC_2 = \dfrac{-T \cdot D_L + IC_2}{T_I}$ remainder<br>(ii) $x - IC_1 \geq 0$<br>   $y = \dfrac{T \cdot I_L + IC_2}{T_I} + IC_1$<br>   $IC = \dfrac{T \cdot I_L + IC_2}{T_I}$ remainder |

What is claimed is:

1. A hierarchical-structure plant control system comprising:

a master controller for computing a plurality of control command signals which are provided respectively corresponding to a plurality of operation terminals of a plant;

a plurality of sub-loop controllers each connected to the master controller through a system bus, and each of which is supplied with the corresponding one of said plurality of control command signals to produce a control output for controlling the positions of the corresponding one of the plurality of operation terminals on the basis of a stored control program;

a host computer for storing a part of the control programs for the plurality of sub-loop controllers and, if one of said plurality of sub-loop controllers breaks down, producing a command which permits the position of the corresponding operation terminal to change in place of the broken-down sub-loop controller;

a plurality of analog memories respectively corresponding to said plurality of sub-loop controllers and connected to said host computer through a common signal line each of which stores a value of a control signal from the corresponding sub-loop controller upon a first operation mode, and increases or decreases the stored value in response to the command from the host computer upon a second operation mode, and transmitting means for, when one of the plurality of sub-loop controllers breaks down, transmitting the failure occurrence information to said host computer, supplying an output of the analog memory corresponding to the broken-down sub-loop controller to the corresponding operation terminal in place of the output of the broken-down sub-loop controller, and changing the operation mode of the corresponding analogy memory into the second operation mode.

2. A plant control system according to claim 1, wherein said analog memories, upon said first operation mode, increase or decrease the stored contents with the timing showing a clock pulse and upon the second operation mode, increase or decrease and stored contents at each application of an increase or decrease command.

3. A plant control system according to claim 1, wherein each of said sub-loop controllers has a function for monitoring whether or not the operation of the corresponding one of the analog memories is abnormal by comparing the output of the corresponding analog memory and the control output computed by itself.

4. A plant control system according to claim 3, wherein said transmitting means performs switching of the operation mode of the corresponding analog memory from the first operation mode to the second operation mode only when it is monitored by the corresponding analog memory that the operations of the corresponding analog memory is normal.

5. A plant control system according to claim 1, further comprising means for manually instructing an increase or decrease of values stored in said analog memories in a manual operation mode.

6. A plant control system according to claim 5, wherein each of said analog memories increases or decreases its stored value in accordance with a first clock pulse supplied from the corresponding analog memory in a first operation mode, and increases or decreases its stored value in accordance with a clock pulse longer in period than the first clock pulse in the manual operation mode.

* * * * *